(12) United States Patent
Kojima et al.

(10) Patent No.: US 12,623,120 B2
(45) Date of Patent: May 12, 2026

(54) GOLF BALL

(71) Applicant: Sumitomo Rubber Industries, Ltd.,
Kobe (JP)

(72) Inventors: Daijiro Kojima, Kobe (JP); Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 151 days.

(21) Appl. No.: 18/434,881

(22) Filed: Feb. 7, 2024

(65) Prior Publication Data

US 2024/0269520 A1 Aug. 15, 2024

(30) Foreign Application Priority Data

Feb. 15, 2023 (JP) ................................. 2023-021307

(51) Int. Cl.
| | |
|---|---|
| *A63B 37/06* | (2006.01) |
| *A63B 37/00* | (2006.01) |
| *C08L 9/00* | (2006.01) |
| *C08L 23/0876* | (2025.01) |

(52) U.S. Cl.
CPC ...... *A63B 37/0075* (2013.01); *A63B 37/0032* (2013.01); *A63B 37/00922* (2020.08); *C08L 9/00* (2013.01); *C08L 23/0876* (2013.01); *C08L 2205/025* (2013.01); *C08L 2205/03* (2013.01)

(58) Field of Classification Search
CPC .......... A63B 37/0075; A63B 37/00922; A63B 37/0063; A63B 37/00621; A63B 37/00622
See application file for complete search history.

(56) References Cited

U.S. PATENT DOCUMENTS

| | | | |
|---|---|---|---|
| 9,566,476 B2 * | 2/2017 | Mikura .................. | C08K 5/375 |
| 2018/0169479 A1 * | 6/2018 | Inoue ................. | A63B 37/0075 |
| 2023/0082849 A1 * | 3/2023 | Watanabe ................. | C08L 9/00 |
| | | | 473/374 |

FOREIGN PATENT DOCUMENTS

| | | |
|---|---|---|
| JP | 2012-130524 A | 7/2012 |
| JP | 2013-009895 A | 1/2013 |
| JP | 2013-031640 A | 2/2013 |
| JP | 2013-248298 A | 12/2013 |
| JP | 2015-077405 A | 4/2015 |
| JP | 2017-077355 A | 4/2017 |
| JP | 2019-198465 A | 11/2019 |

* cited by examiner

*Primary Examiner* — Raeann Gorden
(74) *Attorney, Agent, or Firm* — XSENSUS LLP

(57) ABSTRACT

A golf ball can include a core, a mid layer, and a cover. In the golf ball, a hardness Ho at a central point of the core, a core surface hardness Hs, a hardness H1 at a point to which a distance from the central point of the core can be equal to 25% of a radius of the core, a hardness H2 at a point to which a distance from the central point of the core can be equal to 75% of the radius of the core, a hardness Hm of the mid layer, and a hardness Hc of the cover can satisfy all of the following relational expressions:

$$Ho \le H1 \le H2 \le Hs \qquad (1)$$

$$Ho < Hs \qquad (2)$$

$$(Hm - Hc) \le (Hs - Ho) \qquad (3)$$

$$(Hs - Hc) \le (Hm - Hs). \qquad (4)$$

20 Claims, 1 Drawing Sheet

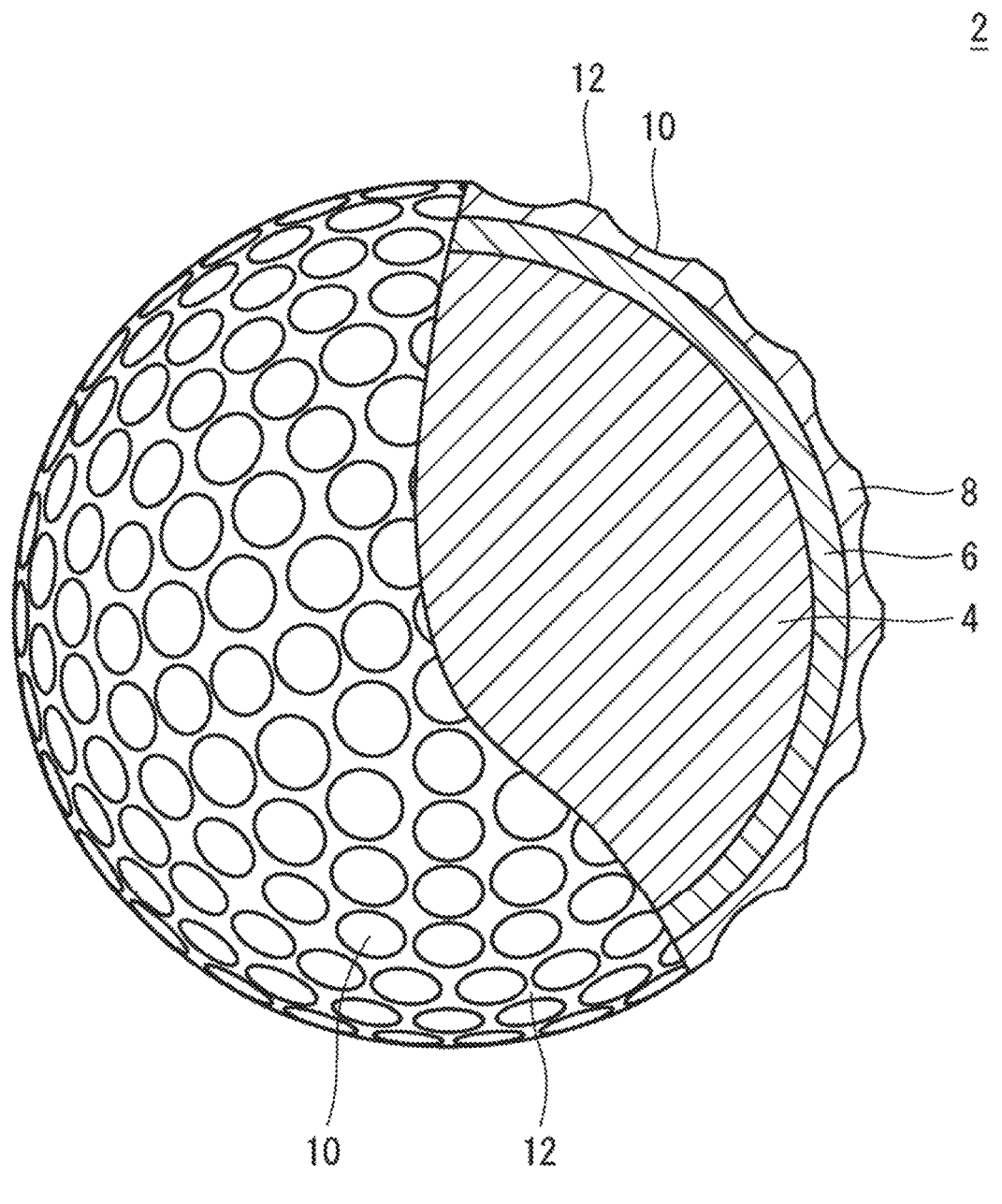

GOLF BALL

CROSS-REFERENCE TO RELATED APPLICATION(S)

The present application claims priority to Japanese patent application JP 2023-021307, filed on Feb. 15, 2023, the entire contents of which is incorporated herein by reference in its entirety.

BACKGROUND

Technical Field

The present specification discloses a golf ball. Specifically, the present specification discloses a golf ball including a core, a mid layer, and a cover.

Background Art

Skilled golf players may place importance on feel at impact when hitting a golf ball. Some golf players prefer soft feel at impact particularly upon an approach shot around the green. From the viewpoint of obtaining soft feel at impact, a golf ball including a flexible cover has been proposed.

The golf ball including the flexible cover also has excellent controllability upon an approach shot. However, the flexible cover impairs the resilience performance of the golf ball. With a low-resilience golf ball, a large flight distance is not obtained upon a shot with a driver. To improve a flight distance upon a shot with a driver, a golf ball having a low spin rate when being hit is advantageous. In order to achieve both desired flight performance and desired controllability in a golf ball including a flexible cover, various attempts have been made to improve the structure and the material of a core.

Japanese Laid-Open Patent Publication No. 2013-31640 discloses a golf ball in which, when the distances (%) from the central point of a core to nine points and JIS-C hardnesses at the nine points, such nine points being obtained by dividing a region from the central point of the core to the surface of the core at intervals of 12.5% of the radius of the core, are plotted in a graph, $R^2$ of a linear approximation curve obtained by a least-squares method is not less than 0.95, and the Shore-D hardness of a mid layer is larger than the Shore-D hardness of a cover. Japanese Laid-Open Patent Publication No. 2012-130524 proposes a golf ball in which the difference between a JIS-C hardness H(5.0) at a point which is located at a distance of 5 mm from the central point of a core and a JIS-C hardness Ho at the central point is not less than 6.0, the difference between a JIS-C hardness H(12.5) at a point which is located at a distance of 12.5 mm from the central point and the hardness Ho is not greater than 4.0, the difference between a JIS-C hardness Hs at the surface of the core and the hardness H(12.5) is not less than 10.0, the difference between the hardness Hs and the hardness Ho is not less than 22.0, there is no zone in which the hardness decreases from the central point toward the surface of the core, and the Shore-D hardness of a mid layer is larger than the Shore-D hardness of a cover.

Japanese Laid-Open Patent Publication No. 2013-248298 discloses a golf ball in which, in a spherical core including at least one rubber layer, when JIS-C hardnesses measured at nine points obtained by equally dividing the thickness of the rubber layer at intervals of 12.5% in the radius direction of the core are plotted relative to a distance (%) from the innermost point of the rubber layer, $R^2$ of a linear approximation curve obtained by a least-squares method is not less than 0.95, the hardness at the outermost point of the rubber layer is larger than the hardness at the innermost point of the rubber layer, and the slab hardness of a mid layer is larger than the slab hardness of a cover. Japanese Laid-Open Patent Publication No. 2013-9895 proposes a golf ball which includes a core obtained by crosslinking a rubber composition containing a base rubber, a co-crosslinking agent, a crosslinking initiator, and a carboxylate and two or more covers and in which the JIS-C hardness of the innermost layer of the cover is larger than the JIS-C hardness at the surface of the core.

Japanese Laid-Open Patent Publication No. 2015-77405 discloses a golf ball in which relational expressions of (1) D−C≥7, (2) C−B≤7, (3)(D−C)−(C−B)≥7, and (4) E−A≥16 are satisfied when the radius of a core is denoted by R (mm), a JIS-C hardness at the central point of the core is denoted by A, a JIS-C hardness at a position away from the central point of the core by R/3 mm is denoted by B, a JIS-C hardness at a position away from the central point of the core by R/1.8 mm is denoted by C, a JIS-C hardness at a position away from the central point of the core by R/1.3 mm is denoted by D, and a JIS-C hardness at the surface of the core is denoted by E.

Japanese Laid-Open Patent Publication No. 2017-77355 proposes a golf ball in which, in a hardness distribution of a core, a JIS-C hardness Hc at the central point of the core, a JIS-C hardness H12 at a position away from the central point of the core by 12 mm, and a JIS-C hardness Ho at the surface of the core satisfy (1) 0≤H12−Hc≤15, (2) 15≤Ho−H12≤30, (3) (Ho−H12)−(H12−Hc)≥10, and (4) 20≤Ho−Hc≤40, and a spin index which is the product of (Ho−H12)−(H12−Hc) and the dynamic friction coefficient of the ball is not less than 3.0. Japanese Laid-Open Patent Publication No. 2019-198465 discloses a golf ball in which, in a hardness distribution of a core, the difference (Cs−Cc) between a Shore-C hardness Cc at the central point of the core and a Shore-C hardness Cs at the surface of the core is not less than 28, and as for a Shore-C hardness at a midpoint M between the central point and the surface of the core, Shore-C hardnesses at points away from the midpoint M to the core surface side by 2.5 mm, 5.0 mm, and 7.5 mm, and Shore-C hardnesses at points away from the midpoint M to the core central point side by 2.5 mm, 5.0 mm, and 7.5 mm, areas A to F obtained from the hardness difference between the respective positions and the differences between the respective specific distances satisfy a specific mathematical formula.

Golf players' requirements for golf balls have increased more than ever. There is still room for improvement in feel at impact, flight performance, and controllability of golf balls.

SUMMARY

A golf ball disclosed according to one or more embodiments of the present disclosure can include a spherical core, a mid layer positioned outside the core, and a cover positioned outside the mid layer. The golf ball can satisfy the following relational expressions (1) to (4):

$$Ho \leq H1 \leq H2 \leq Hs, \tag{1}$$

$$Ho < Hs, \tag{2}$$

-continued $$(Hm - Hc) \leq (Hs - Ho), \text{ and} \qquad (3)$$

$$(Hs - Hc) \leq (Hm - Hs), \qquad (4)$$

wherein

Ho: Shore-C hardness at a central point of the core,

Hs: Shore-C hardness at a surface of the core,

H1: Shore-C hardness at a point to which a distance from the central point of the core is equal to 25% of a radius of the core, H2: Shore-C hardness at a point to which a distance from the central point of the core is equal to 75% of the radius of the core, Hm: Shore-C hardness of the mid layer, and Hc: Shore-C hardness of the cover.

BRIEF DESCRIPTION OF THE DRAWINGS

The FIGURE is a partially cutaway cross-sectional view showing a golf ball according to one embodiment.

DETAILED DESCRIPTION

Hereinafter, preferred embodiments will be described in detail with appropriate reference to the drawing. In the present specification, unless otherwise mentioned, hardness is read as Shore-C hardness.

In a golf ball according to one or more embodiments of the present disclosure, the hardness distribution inside the core and the hardness distribution of the entire golf ball can be regarded as appropriate. The appropriate hardness distributions can compensate for any adverse effect of the flexible cover on resilience performance.

The golf ball, according to one or more embodiments of the present disclosure, can have excellent flight performance upon a shot with a driver. Furthermore, the golf ball can also have excellent spin performance upon an approach shot.

A golf ball 2 according to one or more embodiments of the present disclosure is shown in FIG. 1 and can include a spherical core 4, a mid layer 6 positioned outside the core 4, and a cover 8 positioned outside the mid layer 6. The golf ball 2 can have a plurality of dimples 10 on the surface thereof. Of the surface of the golf ball 2, a part other than the dimples 10 can be regarded as a land 12. The golf ball 2 can include a paint layer and a mark layer on the external side of the cover 8.

The golf ball 2 can have a diameter of not less than 40 mm and not greater than 45 mm, as an example. From the viewpoint of conformity to the rules established by the United States Golf Association (USGA), the diameter can be particularly preferably not less than 42.67 mm. From the viewpoint of suppression of air resistance, the diameter can be more preferably not greater than 44 mm and particularly preferably not greater than 42.80 mm.

The golf ball 2 preferably can have a mass of not less than 40 g and not greater than 50 g. From the viewpoint of attainment of great inertia, the mass can be more preferably not less than 44 g and particularly preferably not less than 45.00 g. From the viewpoint of conformity to the rules established by the USGA, the mass can be particularly preferably not greater than 45.93 g.

From the viewpoint of the resilience performance of the golf ball 2, the core 4 can have a diameter of preferably not less than 34.8 mm, more preferably not less than 35.6 mm, and further preferably not less than 36.8 mm. From the viewpoint that the mid layer 6 and the cover 8 can have sufficient thicknesses, the diameter of the core 4 can be preferably not greater than 40.5 mm, more preferably not greater than 40.0 mm, and further preferably not greater than 39.5 mm. The core 4 can have a radius of preferably not less than 17.4 mm, more preferably not less than 17.8 mm, and further preferably not less than 18.4 mm. The radius of the core 4 can be preferably not greater than 20.25 mm, more preferably not greater than 20.0 mm, and further preferably not greater than 19.75 mm. The core 4 can have a mass of preferably not less than 10 g and not greater than 40 g.

In the golf ball 2, on a cut plane of the core 4 that has been cut into two halves, a hardness Ho at the central point of the core 4, a hardness H1 at a point to which the distance from the central point can be equal to 25% of the radius of the core 4, and a hardness H2 at a point to which the distance from the central point can be equal to 75% of the radius of the core 4 are measured. In addition, a hardness Hs can be measured at the surface of the core 4. A Shore C type hardness scale mounted to an automated hardness meter (trade name "digi test II" manufactured by Heinrich Bareiss Prüfgerätebau GmbH) may be used for measuring each hardness. The hardness Ho, the hardness H1, and the hardness H2 can be measured by pressing the hardness scale against the cut plane of the core 4. The hardness Hs can be measured by pressing the hardness scale against the surface of the core 4. All the measurements may be conducted in an environment of 23° C., for instance.

In the golf ball 2, slab hardnesses of the mid layer 6 and the cover 8 can be measured. As shown, each of the mid layer 6 and the cover 8 of the golf ball 2 can be composed of a single layer. In a golf ball according to another embodiment, the mid layer 6 may be formed of a plurality of layers, and the cover 8 may be formed of a plurality of layers. In the golf ball that includes the mid layer 6 composed of the plurality of layers, a slab hardness of the layer adjacent to the core 4, among the plurality of layers forming the mid layer 6, can be measured. In the golf ball that includes the cover 8 composed of the plurality of layers, a slab hardness of the layer located at the outermost layer, among the plurality of layers forming the cover 8, can be measured.

The slab hardnesses of the mid layer 6 and the cover 8 can be measured according to the standards of "ASTM-D 2240-68," for instance. For the measurement, a sheet that is formed by hot press, that is formed from the same material as that of the mid layer 6 or the cover 8, and that has a thickness of about 2 mm may be used. Prior to the measurement, a sheet may be kept at a temperature of 23° C. for two weeks, for instance. At the measurement, three sheets can be stacked. A Shore C hardness Hm of the mid layer 6 and a Shore C hardness Hc of the cover 8 can be obtained by an automated hardness meter (the aforementioned "digi test II") to which a Shore C type hardness scale can be mounted.

The golf ball 2 according to one or more embodiments of the present disclosure can achieve excellent flight performance upon a shot with a driver by the hardness Ho, the hardness H1, the hardness H2, the hardness Hs, the hardness Hm, and the hardness Hc satisfying the following relational expressions (1) to (4).

$$Ho \leq H1 \leq H2 \leq Hs \qquad (1)$$

$$Ho < Hs \qquad (2)$$

5

-continued $$(Hm - Hc) \leq (Hs - Ho) \tag{3}$$

$$(Hs - Hc) \leq (Hm - Hs). \tag{4}$$

In the golf ball 2 according to one or more embodiments of the present disclosure that satisfies the above expressions (1) and (2), an appropriate hardness distribution can be formed inside the core 4. Preferably, the core 4 can have an outer hard/inner soft hardness distribution as a whole. When the golf ball 2 that includes this core 4 is hit with a driver, the spin rate may be reduced, and a large launch angle can be obtained. The flight distance of the golf ball 2 can be relatively large. Furthermore, the core 4 can also contribute to soft feel at impact upon a shot with a driver.

In the golf ball 2 that satisfies the above expressions (3) and (4), the hardness distribution of the entire golf ball can be regarded as appropriate. Specifically, when a difference Hs–Ho between the hardness Hs and the hardness Ho is denoted by V3 and a difference Hm–Hc between the hardness Hm and the hardness Hc is denoted by V4, V3 can be equal to or larger than V4. In other words, a difference V3–V4 between V3 and V4 may be not less than 0. In the golf ball 2, the hardness difference V3 (=Hs–Ho) inside the core can be larger than the hardness difference V4 (=Hm–Hc) between the mid layer 6 and the cover 8. In the golf ball 2, the resilience performance of the core 4 can be sufficiently exerted, whereby the spin rate can be reduced upon a shot with a driver, and a large flight distance can be obtained.

When a difference Hs–Hc between the hardness Hs and the hardness Hc is denoted by V5 and a difference Hm–Hs between the hardness Hm and the hardness Hs is denoted by V6, V6 can be equal to or larger than V5. In other words, a difference V6–V5 between V6 and V5 may be not less than 0. In the golf ball 2, the mid layer 6 can be relatively hard and the cover 8 can be relatively flexible with respect to the surface hardness Hs of the core 4. In the sphere consisting or comprising of the core 4 and the mid layer 6, an outer hard/inner soft hardness distribution can be formed as a whole. Owing to the hardness distribution formed by the core 4 and the mid layer 6, when the golf ball 2 is hit with a driver, a relatively high ball speed and a relatively low spin rate can be achieved, and an excessive decrease in the spin rate can be avoided by the relatively flexible cover 8, so that spin performance upon an approach shot can be maintained.

In the golf ball 2, the hardness Ho, the hardness H1, the hardness H2, the hardness Hs, the hardness Hm, and the hardness Hc may not be particularly limited, and can be set as appropriate so as to satisfy the relational expressions (1) to (4). For example, the hardness Ho at the central point of the core 4 may be 43 or greater and 57 or less. The golf ball 2 in which the hardness Ho is 43 or greater can be regarded as having excellent resilience performance. From this viewpoint, the hardness Ho can be more preferably 44 or greater and particularly preferably 45 or greater. The golf ball 2 in which the hardness Ho is 57 or less can be regarded as having excellent feel at impact. From this viewpoint, the hardness Ho can be more preferably 56 or less and particularly preferably 55 or less.

The hardness H1 at the point to which the distance from the central point of the core 4 is equal to 25% of the radius of the core 4 may be 53 or greater and 67 or less. The golf ball 2 in which the hardness H1 is 53 or greater can be regarded as having excellent resilience performance. From this viewpoint, the hardness H1 can be more preferably 54 or greater and particularly preferably 55 or greater. The golf ball 2 in which the hardness H1 is 67 or less can be regarded as having excellent feel at impact. From this viewpoint, the hardness H1 can be more preferably 66 or less and particularly preferably 65 or less.

In the golf ball 2, a hardness at a point to which the distance from the central point of the core 4 is equal to 50% of the radius of the core 4 may be measured. This hardness may be 56 or greater, 57 or greater, or 58 or greater. This hardness may be 70 or less, 69 or less, or 68 or less.

The hardness H2 at the point to which the distance from the central point of the core 4 is equal to 75% of the radius of the core 4 may be 68 or greater and 82 or less. The golf ball 2 in which the hardness H2 is 68 or greater can be regarded as having excellent resilience performance. From this viewpoint, the hardness H2 can be more preferably 69 or greater and particularly preferably 70 or greater. The golf ball 2 in which the hardness H2 is 82 or less can be regarded as having excellent feel at impact. From this viewpoint, the hardness H2 can be more preferably 81 or less and particularly preferably 80 or less.

The hardness Hs at the surface of the core 4 may be 78 or greater and 92 or less. The golf ball 2 in which the hardness Hs is 78 or greater can be regarded as having excellent resilience performance. From this viewpoint, the hardness Hs can be more preferably 79 or greater and particularly preferably 80 or greater. The golf ball 2 in which the hardness Hs is 92 or less can be regarded as having excellent feel at impact. From this viewpoint, the hardness Hs can be more preferably 91 or less and particularly preferably 90 or less.

The Shore-C hardness Hm of the mid layer 6 may be 86 or greater and 100 or less. The mid layer 6 having a hardness Hm of 86 or greater can contribute to reducing a spin rate. From the viewpoint of suppressing spin, the hardness Hm can be more preferably 90 or greater and particularly preferably 94 or greater. When the golf ball 2 that includes the mid layer 6 having a hardness Hm of 100 or less is hit, the spin rate may not be excessively reduced. From the viewpoint of approach performance, the hardness Hm can be more preferably 99.5 or less and particularly preferably 99 or less.

The Shore-C hardness Hc of the cover 8 may be 53 or greater and 79 or less. The cover 8 having a hardness Hc of 53 or greater may not impair the flight performance of the golf ball 2. From this viewpoint, the hardness Hc can be more preferably 61 or greater and particularly preferably 67 or greater. The golf ball 2 in which the hardness Hc is 79 or less can be regarded as having excellent feel at impact. From this viewpoint, the hardness Hc can be more preferably 76 or less and particularly preferably 75 or less.

As described above, in the core 4, the hardness Hs can be larger than the hardness Ho. From the viewpoint of spin performance, the difference Hs–Ho between the hardness Hs and the hardness Ho can be preferably not less than 20, more preferably not less than 25, and further preferably not less than 27 in Shore-C hardness. From the viewpoint of resilience performance, the difference Hs–Ho can be preferably not greater than 40, more preferably not greater than 38, and further preferably not greater than 35.

From the viewpoint of obtaining soft feel at impact, a golf ball 2 in which the hardness Hc is smaller than the hardness Hm may be preferable. The difference Hm–Hc between the hardness Hm and the hardness Hc may not be particularly limited, but, from the viewpoint of feel at impact and spin performance, the difference Hm–Hc can be preferably not less than 15, more preferably not less than 18, and further preferably not less than 20 in Shore-C hardness. From the viewpoint of flight performance and durability, the difference Hm–Hc can be preferably not greater than 38, more preferably not greater than 35, and further preferably not greater than 33.

From the viewpoint of feel at impact and spin performance, a golf ball 2 in which the hardness Hc is smaller than the hardness Hs may be preferable. The difference Hs–Hc between the hardness Hs and the hardness Hc may not be particularly limited, but, from the viewpoint of spin performance, the difference Hs–Hc can be preferably not less than 4, more preferably not less than 5, and further preferably not less than 7 in Shore-C hardness. From the viewpoint of not impairing resilience performance, the difference Hs–Hc can be preferably not greater than 18, more preferably not greater than 15, and further preferably not greater than 13.

From the viewpoint that an outer hard/inner soft hardness distribution is formed in the sphere consisting or comprising of the core 4 and the mid layer 6, a golf ball 2 in which the hardness Hm is larger than the hardness Hs may be preferable. The difference Hm–Hs between the hardness Hm and the hardness Hs may not be particularly limited, but, from the viewpoint of suppressing spin, the difference Hm–Hs can be preferably not less than 10, more preferably not less than 11, and further preferably not less than 12 in Shore-C hardness. From the viewpoint of feel at impact, the difference Hm–Hs can be preferably not greater than 20, more preferably not greater than 19, and further preferably not greater than 18.

As described above, in the golf ball 2, when the difference Hs–Ho between the hardness Hs and the hardness Ho is denoted by V3 and the difference Hm–Hc between the hardness Hm and the hardness Hc is denoted by V4, the difference V3–V4 between V3 and V4 can be not less than 0. From the viewpoint of suppressing spin, the difference V3–V4 can be preferably not less than 2, more preferably not less than 3, and further preferably not less than 4. From the viewpoint of feel at impact, the difference V3–V4 can be preferably not greater than 20, more preferably not greater than 18, and further preferably not greater than 15.

As described above, in the golf ball 2, when the difference Hs–Hc between the hardness Hs and the hardness Hc is denoted by V5 and the difference Hm–Hs between the hardness Hm and the hardness Hs is denoted by V6, the difference V6–V5 between V6 and V5 can be not less than 0. From the viewpoint of flight performance, the difference V6–V5 can be preferably not less than 2, more preferably not less than 3, and further preferably not less than 4. From the viewpoint of feel at impact, the difference V6–V5 can be preferably not greater than 15, more preferably not greater than 14, and further preferably not greater than 13.

According to one or more embodiments, in the golf ball 2, the hardness Hc and the hardness H2 can further satisfy the following relational expression (5).

$$Hc \le H2. \tag{5}$$

The cover 8 included in the golf ball 2 that can satisfy the above expression (5) can be regarded as moderately flexible. In the golf ball 2, spin performance (controllability) upon an approach shot can be maintained. When a difference Hc–H2 between the hardness Hc and the hardness H2 is denoted by V2, from the viewpoint of spin performance and feel at impact, the difference V2 can be preferably not greater than 0, more preferably not greater than −1, and further preferably not greater than −3. From the viewpoint of flight performance, the difference V2 can be preferably not less than −10, more preferably not less than −9, and further preferably not less than −8.

According to one or more embodiments, in the golf ball 2, the hardness Hm and the hardness H1 can further satisfy the following relational expression (6).

$$(Hm - H1) \ge 36. \tag{6}$$

When the golf ball 2 that satisfies the above expression (6) is hit with a driver, the spin rate can be reduced. When a difference Hm–H1 between the hardness Hm and the hardness H1 is denoted by V7, from the viewpoint of flight performance, the difference V7 can be more preferably not less than 37 and further preferably not less than 38. From the viewpoint of feel at impact, the difference V7 can be preferably not greater than 42, more preferably not greater than 41, and further preferably not greater than 40.

According to one or more embodiments, in the golf ball 2, the hardness Ho and the hardness Hc can further satisfy the following relational expression (7).

$$Ho \le Hc. \tag{7}$$

The cover 8 included in the golf ball 2 that satisfies the above expression (7) can be regarded as moderately flexible. With the golf ball 2, the spin rate can be reduced upon a shot with a driver, and a high ball speed can be maintained. When a difference Hc–Ho between the hardness Hc and the hardness Ho is denoted by V1, from the viewpoint of flight performance, the difference V1 can be preferably not less than 18, more preferably not less than 19, and further preferably not less than 20. From the viewpoint of not excessively suppressing spin upon an approach shot, the difference V1 can be preferably not greater than 30, more preferably not greater than 29, and further preferably not greater than 28.

From the viewpoint of suppressing spin, the mid layer 6 can have a thickness Tm of preferably not less than 0.5 mm, more preferably not less than 0.6 mm, and further preferably not less than 0.8 mm. From the viewpoint that the resilience performance of the core 4 can be exerted, the thickness Tm can be preferably not greater than 3.0 mm, more preferably not greater than 2.5 mm, and further preferably not greater than 2.0 mm. In the case where the mid layer 6 is formed of a plurality of layers, the sum of the thicknesses of the respective layers can be regarded as the thickness Tm. The thickness Tm can be measured at a position immediately below the land 12.

From the viewpoint of suppressing spin, the cover 8 can have a thickness Tc of preferably not greater than 2.0 mm, more preferably not greater than 1.8 mm, and further preferably not greater than 1.5 mm. From the viewpoint of approach performance and durability, the thickness Tc can be preferably not less than 0.1 mm, more preferably not less than 0.2 mm, and further preferably not less than 0.5 mm.

From the viewpoint of obtaining soft feel at impact, the core 4 can have an amount of compressive deformation Dc of preferably not less than 3.40 mm, more preferably not less than 3.60 mm, and further preferably not less than 3.80 mm. From the viewpoint of durability, the amount of compressive deformation De of the core 4 can be preferably not greater than 5.40 mm, more preferably not greater than 5.20 mm, and further preferably not greater than 5.00 mm.

From the viewpoint of approach performance and feel at impact, the golf ball 2 can have an amount of compressive deformation Db of preferably not less than 3.0 mm, more preferably not less than 3.05 mm, and further preferably not less than 3.10 mm. From the viewpoint of resilience performance, the amount of compressive deformation Db of the golf ball 2 can be preferably not greater than 3.40 mm, more preferably not greater than 3.35 mm, and further preferably not greater than 3.30 mm.

For measurement of an amount of compressive deformation, a YAMADA type compression tester "SCH" may be used. In the tester, a sphere such as the core 4 and the golf ball 2 can be placed on a rigid plate made of metal. Next, a cylinder made of metal can be controlled to gradually descend toward the sphere. The sphere can be squeezed between the bottom face of the cylinder and the hard plate and can become deformed. A movement distance of the cylinder, starting from the state in which an initial load of 98 N is applied to the sphere up to the state in which a final load of 1274 N is applied thereto, for instance, can be measured as an amount of compressive deformation. A movement speed of the cylinder until the initial load is applied can be 0.83 mm/s. A movement speed of the cylinder after the initial load is applied until the final load is applied can be 1.67 mm/s.

Hereinafter, preferable constituent materials for the core 4, the mid layer 6, and the cover 8 according to one or more embodiments will be sequentially described, but other constituent materials may be used as long as the objects intended by the applicant can be achieved.

The core 4 can be formed by crosslinking a rubber composition. Examples of preferable base rubbers for the rubber composition include polybutadienes, polyisoprenes, styrene-butadiene copolymers, ethylene-propylene-diene copolymers, and natural rubbers. From the viewpoint of resilience performance of the core 4, polybutadienes may be preferable. When a polybutadiene and another rubber are used in combination, it may be preferred if the polybutadiene is a principal component. Specifically, the proportion of the polybutadiene to the entire base rubber can be preferably not less than 50% by mass and particularly preferably not less than 80% by mass. A polybutadiene in which the proportion of cis-1,4 bonds is not less than 80% may be particularly preferable. Another rubber used in combination of a polybutadiene can preferably be a polyisoprene.

The rubber composition of the core 4 can preferably contain a co-crosslinking agent. Preferable co-crosslinking agents from the viewpoint of durability and resilience performance of the golf ball 2 can be monovalent or bivalent metal salts of an α,β-unsaturated carboxylic acid having 2 to 8 carbon atoms. Examples of preferable co-crosslinking agents include zinc acrylate, magnesium acrylate, zinc methacrylate, and magnesium methacrylate. Zinc acrylate and zinc methacrylate are preferable, and zinc acrylate can be more preferable.

The rubber composition may contain a metal oxide and an α,β-unsaturated carboxylic acid having 2 to 8 carbon atoms. They both can react with each other in the rubber composition to obtain a salt. The salt can serve as a co-crosslinking agent. Examples of preferable α,β-unsaturated carboxylic acids include acrylic acid and methacrylic acid. Examples of preferable metal oxides include zinc oxide and magnesium oxide.

The amount of the co-crosslinking agent per 100 parts by mass of the base rubber can be preferably not less than 10 parts by mass and not greater than 45 parts by mass. The golf ball 2 in which this amount is not less than 10 parts by mass can be regarded as having excellent resilience performance. From this viewpoint, this amount can be more preferably not less than 15 parts by mass and particularly preferably not less than 20 parts by mass. The golf ball 2 in which this amount is not greater than 45 parts by mass can be regarded as having excellent feel at impact. From this viewpoint, this amount can be more preferably not greater than 40 parts by mass and particularly preferably not greater than 35 parts by mass.

Preferably, the rubber composition of the core 4 can contain an organic peroxide. The organic peroxide can serve as a crosslinking initiator. The organic peroxide can contribute to the durability and the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility can be dicumyl peroxide.

The amount of the organic peroxide per 100 parts by mass of the base rubber can be preferably not less than 0.1 parts by mass and not greater than 3.0 parts by mass. The golf ball 2 in which this amount is not less than 0.1 parts by mass can be regarded as having excellent resilience performance. From this viewpoint, this amount can be more preferably not less than 0.3 parts by mass and particularly preferably not less than 0.5 parts by mass. The golf ball 2 in which this amount is not greater than 3.0 parts by mass can be regarded as having excellent feel at impact. From this viewpoint, this amount can be more preferably not greater than 2.5 parts by mass and particularly preferably not greater than 2.0 parts by mass.

Preferably, the rubber composition of the core 4 can contain an organic sulfur compound. The organic sulfur compound can contribute to a flight distance upon a shot with a driver. Organic sulfur compounds include naphthalenethiol compounds, benzenethiol compounds, and disulfide compounds.

Examples of naphthalenethiol compounds include 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts thereof. Preferable metal salts are zinc salts.

Examples of benzenethiol compounds include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, 2-nitrobenzenethiol, and metal salts thereof. Preferable metal salts are zinc salts.

Examples of disulfide compounds include diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

The amount of the organic sulfur compound per 100 parts by mass of the base rubber can be preferably not less than 0.1 parts by mass and not greater than 1.5 parts by mass. The golf ball 2 in which this amount is not less than 0.1 parts by mass can be regarded as having excellent resilience performance. From this viewpoint, this amount can be more preferably not less than 0.2 parts by mass and particularly preferably not less than 0.3 parts by mass. The golf ball 2 in which this amount is not greater than 1.5 parts by mass can be regarded as having excellent feel at impact. From this viewpoint, this amount can be more preferably not greater than 1.3 parts by mass and particularly preferably not greater than 1.1 parts by mass. Two or more organic sulfur compounds may be used in combination.

Preferably, the rubber composition of the core 4 can contain a carboxylic acid or a carboxylate. The carboxylic acid and the carboxylate can contribute to making the hardness distribution of the core 4 appropriate. The appropriate hardness distribution can reduce a spin rate upon a shot with a driver. An example of preferable carboxylic acids can be benzoic acid. Examples of preferable carboxylates include zinc octoate and zinc stearate. The amount of the carboxylic acid and the carboxylate per 100 parts by mass of the base rubber can be preferably not less than 0.5 parts by mass, more preferably not less than 0.8 parts by mass, and particularly preferably not less than 1.0 part by mass. This amount can be preferably not greater than 20 parts by mass, more preferably not greater than 15 parts by mass, and particularly preferably not greater than 10 parts by mass.

The rubber composition of the core 4 may contain a filler for the purpose of specific gravity adjustment and the like. Examples of suitable fillers include zinc oxide, barium sulfate, calcium carbonate, and magnesium carbonate. The amount of the filler can be determined as appropriate so that the intended specific gravity of the core 4 can be achieved.

The rubber composition of the core 4 may contain various additives, such as sulfur, an anti-aging agent, a coloring agent, a plasticizer, a dispersant, and the like, in an adequate amount. The rubber composition may contain crosslinked rubber powder or synthetic resin powder.

Compression molding can be suitable for the core 4. In the compression molding, the rubber composition can be placed into a mold having a cavity. The rubber composition can be pressurized and heated in the cavity. Due to the pressurization, the rubber composition flows in the cavity. Due to the heating, the rubber can undergo a crosslinking reaction. In the compression molding, the rubber composition can be pressurized at a relatively low pressure, and the rubber composition can be heated at a relatively high temperature, whereby the core 4 in which the hardness Ho, the hardness H1, the hardness H2, and the hardness Hs satisfy the above-described expressions (1) and (2) can be formed. The compression molding may be accomplished in a plurality of stages. Different molding conditions may be employed in the plurality of stages.

The mid layer 6 can be positioned outside the core 4. The material of the mid layer 6 can be a resin composition. Preferably, the mid layer 6 can be formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins may be particularly preferable. Ionomer resins can be regarded as highly elastic. The golf ball 2 that includes the mid layer 6 including an ionomer resin can be regarded as having excellent resilience performance. The golf ball 2 can be regarded as having excellent flight performance upon a shot with a driver.

An ionomer resin and another resin may be used in combination. In this case, from the viewpoint of resilience performance, the ionomer resin can be contained as the principal component of the base polymer. The proportion of the ionomer resin to the entire base polymer can be preferably not less than 50% by mass.

Examples of preferable ionomer resins include binary copolymers formed with an α-olefin and an α,β-unsaturated carboxylic acid having 3 to 8 carbon atoms. A preferable binary copolymer can include 80% by mass or greater and 90% by mass or less of an α-olefin, and 10% by mass or greater and 20% by mass or less of an α,β-unsaturated carboxylic acid. The binary copolymer can be regarded as having excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer can include 70% by mass or greater and 85% by mass or less of an α-olefin, 5% by mass or greater and 30% by mass or less of an α,β-unsaturated carboxylic acid, and 1% by mass or greater and 25% by mass or less of an α,β-unsaturated carboxylate ester. The ternary copolymer can be regarded as having excellent resilience performance. For the binary copolymer and the ternary copolymer, preferable α-olefins can be ethylene and propylene, while preferable α,β-unsaturated carboxylic acids can be acrylic acid and methacrylic acid. A particularly preferable ionomer resin can be a copolymer formed with ethylene and acrylic acid. Another particularly preferable ionomer resin can be a copolymer formed with ethylene and methacrylic acid.

In the binary copolymer and the ternary copolymer, some of the carboxyl groups may be neutralized with metal ions. Examples of metal ions for use in neutralization include sodium ions, potassium ions, lithium ions, zinc ions, calcium ions, magnesium ions, aluminum ions, and neodymium ions. The neutralization may be carried out with two or more types of metal ions. Particularly suitable metal ions from the viewpoint of resilience performance and durability of the golf ball 2 can be sodium ions, zinc ions, lithium ions, and magnesium ions.

Specific examples of ionomer resins can include trade names "HIMILAN 1555," "HIMILAN 1557," "HIMILAN 1605," "HIMILAN 1706," "HIMILAN 1707," "HIMILAN 1855," "HIMILAN 1856," "HIMILAN 8150," "HIMILAN AM7311," "HIMILAN AM7315," "HIMILAN AM7317," "HIMILAN AM7329," and "HIMILAN AM7337," manufactured by DOW-MITSUI POLYCHEMICALS CO., LTD.; trade names "SURLYN 6120," "SURLYN 6910," "SURLYN 7930," "SURLYN 7940," "SURLYN 8140," "SURLYN 8150," "SURLYN 8940," "SURLYN 8945," "SURLYN 9120," "SURLYN 9150," "SURLYN 9910," "SURLYN 9945," "SURLYN AD8546," "HPF1000," and "HPF2000," manufactured by E.I. du Pont de Nemours and Company; and trade names "IOTEK 7010," "IOTEK 7030," "IOTEK 7510," "IOTEK 7520," "IOTEK 8000," and "IOTEK 8030," manufactured by ExxonMobil Chemical Corporation. Two or more ionomer resins may be used in combination.

The resin composition of the mid layer 6 may contain a filler such as zinc oxide, barium sulfate, calcium carbonate, magnesium carbonate, and the like. The resin composition may contain powder of a metal with a high specific gravity, such as tungsten, molybdenum, and the like, as the filler. The amount of the filler can be determined as appropriate such that the intended specific gravity of the mid layer 6 can be accomplished. This resin composition may further contain a coloring agent, a dispersant, an antioxidant, an ultraviolet absorber, a light stabilizer, a fluorescent material, a fluorescent brightener, etc., in an adequate amount or amounts. In the case where the hue of the golf ball 2 is white, a coloring agent can be titanium dioxide.

For forming the mid layer 6, injection molding, compression molding, and the like can be employed.

The cover 8 can be positioned outside the mid layer 6. The material of the cover 8 can be a resin composition. Preferably, the cover 8 can be formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins may be particularly preferable. Ionomer resins can be regarded as highly elastic. The resilience performance of the golf ball 2 that includes the cover 8 containing an ionomer resin may not be impaired. The golf ball 2 can achieve both desired approach performance and desired flight performance. The ionomer resins described above for the mid layer 6 can be used for the cover 8.

An ionomer resin and another resin may be used in combination. In this case, from the viewpoint of resilience performance, the ionomer resin can be contained as the principal component of the base polymer. The proportion of the ionomer resin to the entire base polymer can be preferably not less than 50% by mass, more preferably not less than 70% by mass, and particularly preferably not less than 80% by mass.

A preferable resin that can be used in combination with an ionomer resin can be an ethylene-(meth)acrylic acid copolymer. This copolymer can be obtained by a copolymerization reaction of a monomer composition that contains ethylene and (meth)acrylic acid. In this copolymer, some of the carboxyl groups may be neutralized with metal ions. This copolymer can include 3% by mass or greater and 25% by mass or less of a (meth)acrylic acid component. An ethylene-(meth)acrylic acid copolymer having a polar functional group may be particularly preferable. A specific example of ethylene-(meth)acrylic acid copolymers can be trade name "NUCREL" manufactured by DOW-MITSUI POLYCHEMICALS CO., LTD.

The resin composition of the cover 8 may contain a coloring agent, a filler, a dispersant, an antioxidant, an ultraviolet absorber, a light stabilizer, a fluorescent material, a fluorescent brightener, etc., in an adequate amount. In the case where the hue of the golf ball 2 is white, a coloring agent can be titanium dioxide.

For forming the cover 8, injection molding, compression molding, and the like can be employed. During molding of the cover 8, the dimples 10 can be formed by pimples formed on the cavity face of a mold.

EXAMPLES

Hereinafter, one or more advantageous effects of golf balls according to Examples will be shown, but the scope disclosed in the present specification should not be construed in a limited manner on the basis of the description of these Examples.

Example 1

A rubber composition D was obtained by kneading 100 parts by mass of a high-cis polybutadiene (trade name "BR-730," manufactured by JSR Corporation), 28 parts by mass of zinc acrylate, 10 parts by mass of zinc oxide, 12.2 parts by mass of barium sulfate, 0.9 parts by mass of dicumyl peroxide, 1 part by mass of pentachlorothiophenol zinc salt, and 3 parts by mass of benzoic acid. The rubber composition D was placed into a mold including upper and lower mold halves each having a hemispherical cavity. The rubber composition D was pressurized and heated under the following conditions to obtain a core having a diameter of 38.7 mm.

First Stage
    Temperature: 120° C.
    Pressure: 35 kgf/cm$^2$
    Time: 5 min
Second Stage
    Temperature: 160° C.
    Pressure: 35 kgf/cm$^2$
    Time: 15 min A resin composition M1 for a mid layer was obtained by kneading 50 parts by mass of an ionomer resin (aforementioned "HIMILAN AM7329"), 25 parts by mass of another ionomer resin (aforementioned "HIMILAN 1605"), 25 parts by mass of still another ionomer resin (aforementioned "SURLYN 8150"), 6 parts by mass of barium sulfate, 4 parts by mass of titanium dioxide, and 0.2 parts by mass of a light stabilizer (trade name "JF-90," manufactured by Johoku Chemical Co., Ltd.) with a twin-screw kneading extruder. The core was placed into a mold including upper and lower mold halves each having a hemispherical cavity. The core was covered with the resin composition M1 by injection molding to form a mid layer. The thickness of the mid layer was 1.00 mm.

A resin composition C1 was obtained by kneading 80 parts by mass of an ionomer resin (aforementioned "HIMILAN 1855"), 20 parts by mass of an ethylene-(meth)acrylic acid copolymer (trade name "NUCREL N1050H," manufactured by DOW-MITSUI POLYCHEMICALS CO., LTD.), 4 parts by mass of titanium dioxide, and 0.2 parts by mass of a light stabilizer (aforementioned "JF-90") with a twin-screw kneading extruder. The sphere consisting of the core and the mid layer was placed into a mold including upper and lower mold halves each having a hemispherical cavity. The sphere was covered with the resin composition C1 by injection molding to form a cover. The thickness of the cover was 1.00 mm.

A clear paint including a two-component curing type polyurethane as a base material was applied to this cover to obtain a golf ball of Example 1 having a diameter of about 42.7 mm and a mass of about 45.6 g.

Examples 2 to 8 and Comparative Examples 1 to 6

Golf balls of Examples 2 to 8 and Comparative Examples 1 to 6 were obtained in the same manner as Example 1, except that the specifications of the core, the mid layer, and the cover and the vulcanization conditions for the core were set as shown in Tables 4 to 6 below. The specifications of the core and the vulcanization conditions are shown in detail in Table 1 below. The composition of the mid layer is shown in detail in Table 2 below. The composition of the cover is shown in detail in Table 3 below.

[Flight Distance with Driver (W #1)]

A driver with a head made of a titanium alloy (trade name "XXIO 12," manufactured by Sumitomo Rubber Industries, Ltd., shaft hardness: R, loft angle: 10.5 degrees) was attached to a swing machine manufactured by Golf Laboratories, Inc. A golf ball was hit under a condition of a head speed of 35 m/sec. The flight distance (m) from the launch point to the stop point, the ball speed (m/sec) immediately after the hit, and the spin rate (rpm) were measured. The average value of data obtained by 12 measurements for each golf ball was used as a measurement value for the golf ball. The ball speed, the spin rate, and the flight distance thus obtained are shown in Tables 4 to 6 below.

[Approach Performance: Hit with Sand Wedge (SW)]

A wedge (trade name "558 RTX2.0 Tour Satin Wedge," manufactured by Cleveland Golf Company, Inc., shaft hardness: S, loft angle: 52 degrees) was attached to a swing machine manufactured by Golf Laboratories, Inc. A golf ball was hit under a condition of a head speed of 16 m/sec, and the spin rate (rpm) was measured. The average value of data obtained by 12 measurements for each golf ball is shown in Tables 4 to 6 below.

TABLE 1

| | (parts by mass) | | |
|---|---|---|---|
| | B | C | D |
| Polybutadiene | 96 | 94 | 100 |
| Polyisoprene | 4 | 6 | 0 |
| Zinc acrylate | 25 | 29.5 | 28 |
| Zinc oxide | 5 | 10 | 10 |
| Barium sulfate | 15.4 | 7.9 | 12.2 |
| Dicumyl peroxide | 0.7 | 0.9 | 0.9 |
| Pentachlorothiophenol zinc salt | 0.3 | 0.4 | 1 |
| Benzoic acid | 0 | 2 | 3 |
| First stage | | | |
| Temperature (° C.) | 120 | 120 | 120 |
| Time (min) | 5 | 5 | 5 |
| Pressure (kgf/cm$^2$) | 35 | 35 | 35 |
| Second stage | | | |
| Temperature (° C.) | 170 | 160 | 160 |
| Time (min) | 13.5 | 15.5 | 15 |
| Pressure (kgf/cm$^2$) | 100 | 35 | 35 |

The details of the compounds listed in Table 1 are as follows.

Polybutadiene: high-cis polybutadiene rubber, manufactured by JSR Corporation, trade name "BR730" (cis-1,4-bond content=96% by mass, 1,2-vinyl bond content=1.3% by mass, Mooney viscosity (ML1+4(100° C.))=55, molecular weight distribution (Mw/Mn)=3)

Polyisoprene: trade name "IR2200," manufactured by JSR Corporation

Zinc acrylate: trade name "ZN-DA90S," manufactured by NISSHOKU TECHNO FINE CHEMICAL CO., LTD. (containing 10% by mass of zinc stearate)

Zinc oxide: trade name "Ginrei R," manufactured by Toho Zinc Co., Ltd.

Barium sulfate: trade name "Barium Sulfate BD," manufactured by Sakai Chemical Industry Co., Ltd.

Dicumyl peroxide: product of Tokyo Chemical Industry Co., Ltd.

Pentachlorothiophenol zinc salt: product of Tokyo Chemical Industry Co., Ltd.

Benzoic acid: product of Tokyo Chemical Industry Co., Ltd.

TABLE 2

| | Mid layer | |
|---|---|---|
| | (parts by mass) | |
| | M1 | M2 |
| HIMILAN AM7329 | 50 | 40 |
| HIMILAN 1605 | 25 | 20 |
| HIMILAN 1555 | 0 | 40 |
| SURLYN 8150 | 25 | 0 |
| Barium sulfate | 6 | 6 |
| Titanium dioxide | 4 | 4 |
| JF-90 | 0.2 | 0.2 |
| Hardness (Shore-C) | 99 | 94 |

The details of the compounds listed in Table 2 are as follows.

HIMILAN AM7329: ionomer resin manufactured by DOW-MITSUI POLYCHEMICALS CO., LTD.

HIMILAN 1605: ionomer resin manufactured by DOW-MITSUI POLYCHEMICALS CO., LTD.

HIMILAN 1555: ionomer resin manufactured by DOW-MITSUI POLYCHEMICALS CO., LTD.

SURLYN 8150: ionomer resin manufactured by E.I. du Pont de Nemours and Company

Barium sulfate: trade name "Barium Sulfate BD," manufactured by Sakai Chemical Industry Co., Ltd.

Titanium dioxide: trade name "A-220," manufactured by ISHIHARA SANGYO KAISHA, LTD.

JF-90: light stabilizer manufactured by Johoku Chemical Co., Ltd.

TABLE 3

| | Cover | | | | |
|---|---|---|---|---|---|
| | (parts by mass) | | | | |
| | C1 | C2 | C3 | C4 | C5 |
| HIMILAN 1855 | 80 | 65 | 50 | 35 | 0 |
| HIMILAN AM7327 | 0 | 15 | 30 | 45 | 0 |
| NUCREL N1050H | 20 | 20 | 20 | 20 | 0 |
| ELASTOLLAN NY88A | 0 | 0 | 0 | 0 | 50 |
| ELASTOLLAN NY90A | 0 | 0 | 0 | 0 | 50 |
| Titanium dioxide | 4 | 4 | 4 | 4 | 4 |
| JF-90 | 0.2 | 0.2 | 0.2 | 0.2 | 0.2 |
| Hardness (Shore-C) | 76 | 72 | 68 | 66 | 59 |

The details of the compounds listed in Table 3 are as follows.

HIMILAN 1855: ionomer resin manufactured by DOW-MITSUI POLYCHEMICALS CO., LTD.

HIMILAN AM7327: ionomer resin manufactured by DOW-MITSUI POLYCHEMICALS CO., LTD.

NUCREL N1050H: ethylene-(meth)acrylic acid copolymer manufactured by DOW-MITSUI POLYCHEMICALS CO., LTD.

ELASTOLLAN NY88A: thermoplastic polyurethane elastomer manufactured by BASF JAPAN LTD.

ELASTOLLAN NY90A: thermoplastic polyurethane elastomer manufactured by BASF JAPAN LTD.

Titanium dioxide: trade name "A-220", manufactured by ISHIHARA SANGYO KAISHA, LTD.

JF-90: light stabilizer manufactured by Johoku Chemical Co., Ltd.

TABLE 4

| | | Comp. Ex. 1 | Comp. Ex. 2 | Ex. 1 | Comp. Ex. 3 | Comp. Ex. 4 |
|---|---|---|---|---|---|---|
| Core | | B | B | D | D | D |
| Amount of compressive deformation Dc of core | [mm] | 4.05 | 4.05 | 4.10 | 4.10 | 4.10 |
| Hardness distribution (Shore-C) | | | | | | |
| Ho | [—] | 62 | 62 | 53 | 53 | 53 |
| H1 | [—] | 65 | 65 | 62 | 62 | 62 |
| H2 | [—] | 72 | 72 | 75 | 75 | 75 |
| Hs | [—] | 78 | 78 | 80 | 80 | 80 |
| Mid layer | | M1 | M1 | M1 | M1 | M1 |
| Hm (Shore-C) | [—] | 99 | 99 | 99 | 99 | 99 |
| Cover | | C3 | C5 | C1 | C3 | C5 |
| Hc (Shore-C) | [—] | 68 | 59 | 76 | 68 | 59 |
| Amount of compressive deformation Db of ball | [mm] | 3.20 | 3.30 | 3.10 | 3.20 | 3.30 |
| V1 = Hc − Ho | [—] | 6 | −3 | 23 | 15 | 6 |
| V2 = Hc − H2 | [—] | −4 | −13 | 1 | −7 | −16 |
| V3 = Hs − Ho | [—] | 16 | 16 | 27 | 27 | 27 |
| V4 = Hm − Hc | [—] | 31 | 40 | 23 | 31 | 40 |
| V3 − V4 | [—] | −15 | −24 | 4 | −4 | −13 |
| V5 = Hs − Hc | [—] | 10 | 19 | 4 | 12 | 21 |
| V6 = Hm − Hs | [—] | 21 | 21 | 19 | 19 | 19 |
| V6 − V5 | [—] | 11 | 2 | 15 | 7 | −2 |
| V7 = Hm − H1 | [—] | 34 | 34 | 37 | 37 | 37 |
| Evaluation results | | | | | | |
| W#1 ball speed | [m/s] | 50.95 | 50.64 | 51.09 | 50.81 | 50.50 |
| W#1 spin rate | [rpm] | 2720 | 2842 | 2576 | 2684 | 2806 |
| W#1 flight distance | [m] | 168.4 | 166.3 | 170.5 | 168.5 | 166.6 |
| AP spin rate | [rpm] | 4496 | 4668 | 4277 | 4488 | 4680 |

TABLE 5

| | | Ex. 2 | Ex. 3 | Ex. 4 | Ex. 5 | Comp. Ex. 5 |
|---|---|---|---|---|---|---|
| Core | | C | C | C | C | C |
| Amount of compressive deformation Dc of core | [mm] | 4.10 | 4.10 | 4.10 | 4.10 | 4.10 |
| Hardness distribution (Shore-C) | | | | | | |
| Ho | [—] | 48 | 48 | 48 | 48 | 48 |
| H1 | [—] | 59 | 59 | 59 | 59 | 59 |
| H2 | [—] | 75 | 75 | 75 | 75 | 75 |
| Hs | [—] | 81 | 81 | 81 | 81 | 81 |
| Mid layer | | M1 | M1 | M1 | M1 | M1 |
| Hm (Shore-C) | [—] | 99 | 99 | 99 | 99 | 99 |
| Cover | | C1 | C2 | C3 | C4 | C5 |
| Hc (Shore-C) | [—] | 76 | 72 | 68 | 66 | 59 |
| Amount of compressive deformation Db of ball | [mm] | 3.10 | 3.15 | 3.20 | 3.25 | 3.30 |
| V1 = Hc − Ho | [—] | 28 | 24 | 20 | 18 | 11 |
| V2 = Hc − H2 | [—] | 1 | −3 | −7 | −9 | −16 |
| V3 = Hs − Ho | [—] | 33 | 33 | 33 | 33 | 33 |
| V4 = Hm − Hc | [—] | 23 | 27 | 31 | 33 | 40 |
| V3 − V4 | [—] | 10 | 6 | 2 | 0 | −7 |
| V5 = Hs − Hc | [—] | 5 | 9 | 13 | 15 | 22 |
| V6 = Hm − Hs | [—] | 18 | 18 | 18 | 18 | 18 |
| V6 − V5 | [—] | 13 | 9 | 5 | 3 | −4 |
| V7 = Hm − H1 | [—] | 40 | 40 | 40 | 40 | 40 |

TABLE 5-continued

| | | Ex. 2 | Ex. 3 | Ex. 4 | Ex. 5 | Comp. Ex. 5 |
|---|---|---|---|---|---|---|
| Evaluation results | | | | | | |
| W#1 ball speed | [m/s] | 51.20 | 51.06 | 50.92 | 50.67 | 50.43 |
| W#1 spin rate | [rpm] | 2426 | 2473 | 2512 | 2576 | 2716 |
| W#1 flight distance | [m] | 172.7 | 171.9 | 171.1 | 169.9 | 167.7 |
| AP spin rate | [rpm] | 4290 | 4381 | 4488 | 4584 | 4697 |

TABLE 6

| | | Ex. 6 | Ex. 7 | Ex. 8 | Comp. Ex. 6 |
|---|---|---|---|---|---|
| Core | | C | C | C | C |
| Amount of compressive deformation Dc of core | [mm] | 4.10 | 4.10 | 4.10 | 4.10 |
| Hardness distribution (Shore-C) | | | | | |
| Ho | [—] | 48 | 48 | 48 | 48 |
| H1 | [—] | 59 | 59 | 59 | 59 |
| H2 | [—] | 75 | 75 | 75 | 75 |
| Hs | [—] | 81 | 81 | 81 | 81 |
| Mid layer | | M1 | M2 | M2 | M2 |
| Hm (Shore-C) | [—] | 94 | 94 | 94 | 94 |
| Cover | | C1 | C2 | C3 | C4 |
| Hc (Shore-C) | [—] | 76 | 72 | 68 | 66 |
| Amount of compressive deformation Db of ball | [mm] | 3.15 | 3.20 | 3.25 | 3.30 |
| V1 = Hc − Ho | [—] | 28 | 24 | 20 | 18 |
| V2 = Hc − H2 | [—] | 1 | −3 | −7 | −9 |
| V3 = Hs − Ho | [—] | 33 | 33 | 33 | 33 |
| V4 = Hm − Hc | [—] | 18 | 22 | 26 | 28 |
| V3 − V4 | [—] | 15 | 11 | 7 | 5 |
| V5 = Hs − Hc | [—] | 5 | 9 | 13 | 15 |
| V6 = Hm − Hs | [—] | 13 | 13 | 13 | 13 |
| V6 − V5 | [—] | 8 | 4 | 0 | −2 |
| V7 = Hm − H1 | [—] | 35 | 35 | 35 | 35 |
| Evaluation results | | | | | |
| W#1 ball speed | [m/s] | 50.80 | 50.71 | 50.57 | 50.41 |
| W#1 spin rate | [rpm] | 2501 | 2518 | 2594 | 2614 |
| W#1 flight distance | [m] | 171.1 | 170.8 | 169.5 | 169.1 |
| AP spin rate | [rpm] | 4286 | 4390 | 4476 | 4594 |

As shown in Tables 4 to 6, the golf ball of each Example particularly has excellent flight performance upon a shot with a driver. Furthermore, the golf ball of each Example has excellent controllability upon an approach shot. From the evaluation results, advantages of the golf ball are clear.

Present Disclosure (1) is a golf ball including a spherical core, a mid layer positioned outside the core, and a cover positioned outside the mid layer, the golf ball satisfying the following relational expressions (1) to (4):

$$Ho \le H1 \le H2 \le Hs, \tag{1}$$

$$Ho < Hs, \tag{2}$$

$$(Hm - Hc) \le (Hs - Ho), \text{ and} \tag{3}$$

$$(Hs - Hc) \le (Hm - Hs), \tag{4}$$

wherein

Ho: Shore-C hardness at a central point of the core,

Hs: Shore-C hardness at a surface of the core,

H1: Shore-C hardness at a point to which a distance from the central point of the core is equal to 25% of a radius of the core, H2: Shore-C hardness at a point to which a distance from the central point of the core is equal to 75% of the radius of the core, Hm: Shore-C hardness of the mid layer, and Hc: Shore-C hardness of the cover.

Present Disclosure (2) is the golf ball according to Present Disclosure (1), further satisfying the following relational expression (5):

$$Hc \leq H2. \tag{5}$$

Present Disclosure (3) is the golf ball according to Present Disclosure (1) or (2), further satisfying the following relational expression (6):

$$(Hm - H1) \geq 36. \tag{6}$$

Present Disclosure (4) is the golf ball according to any one of Present Disclosures (1) to (3), further satisfying the following relational expression (7):

$$Ho \leq Hc. \tag{7}$$

Present Disclosure (5) is the golf ball according to any one of Present Disclosures (1) to (4), wherein a material of the mid layer is a resin composition, and a base polymer of the resin composition is an ionomer resin.

Present Disclosure (6) is the golf ball according to any one of Present Disclosures (1) to (5), wherein a material of the cover is a resin composition, and a base polymer of the resin composition is an ionomer resin.

Present Disclosure (7) is a method comprising: providing a golf ball including: a spherical core, a mid layer positioned outside the core, and a cover positioned outside the mid layer, the golf ball satisfying the following relational expressions (1) to (4):

$$Ho \leq H1 \leq H2 \leq Hs, \tag{1}$$

$$Ho < Hs, \tag{2}$$

$$(Hm - Hc) \leq (Hs - Ho), \text{ and} \tag{3}$$

$$(Hs - Hc) \leq (Hm - Hs), \tag{4}$$

wherein

Ho: Shore-C hardness at a central point of the core,

Hs: Shore-C hardness at a surface of the core,

H1: Shore-C hardness at a point to which a distance from the central point of the core is equal to 25% of a radius of the core, H2: Shore-C hardness at a point to which a distance from the central point of the core is equal to 75% of the radius of the core, Hm: Shore-C hardness of the mid layer, and Hc: Shore-C hardness of the cover.

Present Disclosure (8) is the method according to (7), wherein the golf ball further satisfies the following relational expression (5):

$$Hc \leq H2. \tag{5}$$

Present Disclosure (9) is the method according to Present Disclosure (7) or Present Disclosure (8) wherein the golf ball further satisfies the following relational expression (6): (Hm-H1)≥36 (6).

Present Disclosure (10) is the method according to any one of Present Disclosure (7) to Present Disclosure (9), wherein the golf ball further satisfies the following relational expression (7): Ho≤Hc (7).

Present Disclosure (11) is the method according to any one of Present Disclosure (7) to Present Disclosure (10), wherein a material of the mid layer is a resin composition, and a base polymer of the resin composition is an ionomer resin.

Present Disclosure (12) is the method according to any one of Present Disclosure (7) to Present Disclosure (11), wherein a material of the cover is a resin composition, and a base polymer of the resin composition is an ionomer resin.

The golf ball described above can be used for, for example, playing golf on golf courses and practicing at driving ranges.

What is claimed is:

1. A golf ball comprising:

a spherical core, a mid layer positioned outside the core, and a cover positioned outside the mid layer, the golf ball satisfying the following relational expressions (1) to (4):

$$Ho \leq H1 \leq H2 \leq Hs, \tag{1}$$

$$Ho < Hs, \tag{2}$$

$$(Hm - Hc) \leq (Hs - Ho), \text{ and} \tag{3}$$

$$(Hs - Hc) \leq (Hm - Hs), \tag{4}$$

wherein

Ho: Shore-C hardness at a central point of the core,

Hs: Shore-C hardness at a surface of the core,

H1: Shore-C hardness at a point to which a distance from the central point of the core is equal to 25% of a radius of the core, H2: Shore-C hardness at a point to which a distance from the central point of the core is equal to 75% of the radius of the core, Hm: Shore-C hardness of the mid layer, and Hc: Shore-C hardness of the cover, wherein a difference between Hm-H1 is not less than 37 and not greater than 42, and wherein a difference between Hc−H2 is not greater than 0 and not less than −10.

2. The golf ball according to claim 1, further satisfying the following relational expression (7):

$$Ho \leq Hc. \tag{7}$$

3. The golf ball according to claim 1, wherein
a material of the mid layer is a resin composition, and
a base polymer of the resin composition is an ionomer
resin.

4. The golf ball according to claim 1, wherein
a material of the cover is a resin composition, and
a base polymer of the resin composition is an ionomer
resin.

5. The golf ball according to claim 1, wherein
the core has an amount of compressive deformation De of
not less than 3.40 mm and not greater than 5.40 mm,
and
the golf ball has an amount of compressive deformation
Db of not less than 3.0 mm and not greater than 3.40
mm.

6. The golf ball according to claim 5, wherein
the mid layer has a thickness Tm of not less than 0.5 mm
and not greater than 3.0 mm, and
the cover has a thickness Tc of not greater than 2.0 mm
and not less than 0.1 mm.

7. The golf ball according to claim 2, wherein a difference
Hc–Ho is not less than 18 and not greater than 30.

8. The golf ball according to claim 1, wherein a second
difference Hm–Hc subtracted from a first difference Hs–Ho
is not less than zero and not greater than 20.

9. The golf ball according to claim 1, wherein a second
difference Hs–Hc subtracted from a first difference Hm-Hs
is not less than 0 and not greater than 15.

10. The golf ball according to claim 1, wherein
the hardness Hc is smaller than the hardness Hm by not
less than 20 and not greater than 33,
the hardness Hc is smaller than the hardness Hs by not
less than 7 in Shore-C hardness and not greater than 13,
and
the hardness Hm is larger than the hardness Hs by not less
than 12 and not greater than 18.

11. A method comprising:
providing a golf ball including:
a spherical core,
a mid layer positioned outside the core, and
a cover positioned outside the mid layer, the golf ball
satisfying the following relational expressions (1) to
(4):

$$Ho \leq H1 \leq H2 \leq Hs, \quad (1)$$

$$Ho < Hs, \quad (2)$$

$$(Hm - Hc) \leq (Hs - Ho), \text{ and} \quad (3)$$

$$(Hs - Hc) \leq (Hm - Hs), \quad (4)$$

wherein
Ho: Shore-C hardness at a central point of the core,
Hs: Shore-C hardness at a surface of the core,
H1: Shore-C hardness at a point to which a distance from
the central point of the core is equal to 25% of a radius
of the core,
H2: Shore-C hardness at a point to which a distance from
the central point of the core is equal to 75% of the
radius of the core,
Hm: Shore-C hardness of the mid layer, and
Hc: Shore-C hardness of the cover,
wherein Hm-H1 is not less than 37 and not greater than
42, and
wherein a difference between Hc–H2 is not greater than
0 and not less than −10.

12. The method according to claim 11, wherein the golf
ball further satisfies the following relational expression (7):

$$Ho \leq Hc \quad (7).$$

13. The method according to claim 11, wherein
a material of the mid layer is a resin composition, and
a base polymer of the resin composition is an ionomer
resin.

14. The method according to claim 11, wherein
a material of the cover is a resin composition, and
a base polymer of the resin composition is an ionomer
resin.

15. The method according to claim 11, wherein
the core has an amount of compressive deformation De of
not less than 3.40 mm and not greater than 5.40 mm,
and
the golf ball has an amount of compressive deformation
Db of not less than 3.0 mm and not greater than 3.40
mm.

16. The method according to claim 15, wherein
the mid layer has a thickness Tm of not less than 0.5 mm
and not greater than 3.0 mm, and
the cover has a thickness Tc of not greater than 2.0 mm
and not less than 0.1 mm.

17. The method according to claim 12, wherein a differ-
ence Hc–Ho is not less than 18 and not greater than 30.

18. The method according to claim 11, wherein a second
difference Hm–Hc subtracted from a first difference Hs–Ho
is not less than zero and not greater than 20.

19. The method according to claim 11, wherein a second
difference Hs–Hc subtracted from a first difference Hm–Hs
is not less than 0 and not greater than 15.

20. The method according to claim 11, wherein
the hardness Hc is smaller than the hardness Hm by not
less than 20 and not greater than 33,
the hardness Hc is smaller than the hardness Hs by not
less than 7 in Shore-C hardness and not greater than 13,
and
the hardness Hm is larger than the hardness Hs by not less
than 12 and not greater than 18.

\* \* \* \* \*